Aug. 16, 1949.　　　　C. G. GERHOLD　　　　2,479,108
FRACTIONAL DISTILLATION
Filed May 24, 1945

Inventor:
Clarence G. Gerhold
By Lee J. Gary
Attorney

Patented Aug. 16, 1949

2,479,108

UNITED STATES PATENT OFFICE 2,479,108

FRACTIONAL DISTILLATION

Clarence G. Gerhold, Riverside, Ill., assignor to Universal Oil Products Company, Chicago, Ill., a corporation of Delaware Application May 24, 1945, Serial No. 595,524

3 Claims. (Cl. 261—79)

This invention relates to an improved method of rectification or fractionation and to an improved type of fractionating column, such as is used in petroleum refining processes. The improved apparatus of this invention provides a centrifugal liquid and vapor contact useful in absorption and gas scrubbing processes, as well as for fractionation.

One object of the invention is to provide an improved method of fractionation and countercurrent liquid and vapor contact.

Another object of this invention is to provide an improved type of fractionating column or apparatus.

Still another object of this invention is to provide an improved type of contact tray or deck within the fractionating column which is of relatively simple construction and eliminates the need of the usual multiplicity of risers and bubble caps.

The improved flow through the fractionating column is accomplished by a centrifugally whirling contact between the upflowing vapor stream and the downflowing stream of condensate. The rising vapor stream is caused to whirl in the manner of an inverted vortex, aided by a series of stationary impeller vanes placed below each tray or contact deck, such that a mist is formed above the tray by the whirling vapor stream and the liquid stream. The rising vapors become concentrated at a center opening in each tray, such that a rapid centrifugally rotating stream is effected which will pick up the liquid from the edge of the center opening at the top surface of each tray. The mist of vapor and condensate is then centrifuged outwardly to the side wall of the column, where the liquid condensate may run down into the downspout which is provided along the inside wall of the chamber.

A plurality of trays are spaced vertically in this improved fractionating tower, much in the same manner as the usual type of bubble decks which are commonly used. However, the new type of trays effect a centrifugal contact between the condensate and vapor, because of the flow path provided and aid given by the stationary vanes which are placed below each tray also in the flow path of the rising gases. This type of centrifugal contact eliminates the usual type of bubbling contact which is effected by caps and risers, also this centrifugal method of contact as applied to rectification or fractionation provides an efficient and positive countercurrent contact flow means, with no chance whatever for condensate or reflux to be by-passed by the vapor stream. The tray itself in this present invention may be low in cost and comparatively simple in construction and assembly.

The interchange of material which takes place in fractionation between the liquid and vapor phases is inherently a diffusional process, such that the apparatus in which it takes place must provide for a countercurrent flow of the reflux and the vapors and intimate mixing of the two streams throughout the countercurrent flow path.

Various types of fractionating columns are in present use; however, fractionating columns are most commonly of the bubble-tray type, with liquid and vapor contact being accomplished through a number of risers and bubble caps. All types and shapes of risers and caps have been devised for bubble decks. One of the disadvantages of bubble caps is that each one requires individual spacing and supporting means, such that there is a great deal of assembly required to complete each tray in addition to the necessary mounting of each tray in the chamber.

Perforated or sieve-plate towers have also been used for fractionation; however, their operation is more difficult than the bubble tray type and their efficiency rather limited. This type of column has not been widely used in the petroleum industry.

Packed towers, which consist of upright columns having a filling of loose pieces of solid material, generally of uniform size, have also found some use for fractionation. The pieces which are used may be Raschig rings, Berl saddles, or a variety of similar materials. These materials are usually thrown in at random into the tower and are usually of a material which will not be attacked by the material being distilled. The reflux and vapor streams become distributed in the interstices of the packed bed to accomplish the countercurrent contact. Packed towers are not generally used as fractionating columns where large capacity is required because of channeling and rather high pressure drop difficulties; however, the petroleum refining industry has made considerable use of this type of tower for absorption and scrubbing operations.

The new type of mixing tray which provides the improved method of fractionation in this invention comprises a flat liquid receiving deck plate having a round center opening, a lower vapor deflecting baffle plate spaced slightly below the center of the deck plate, a number of stationary impeller vanes placed between the lower side of the deck plate and the vapor deflecting plate, a series of vertical tapered stationary fins on top of the deck plate which act to stop the centrifugal whirl of the liquid on the deck plate, and a half annular ring downspout, which is adjacent the fractionating column wall and is adapted to carry a portion of the centrifuged condensate from the column wall above the tray to the liquid receiving plate of the tray next below.

The accompanying drawing and following description thereof should make more apparent the features of the invention and the construction details of the preferred form of the apparatus.

Figure 1:
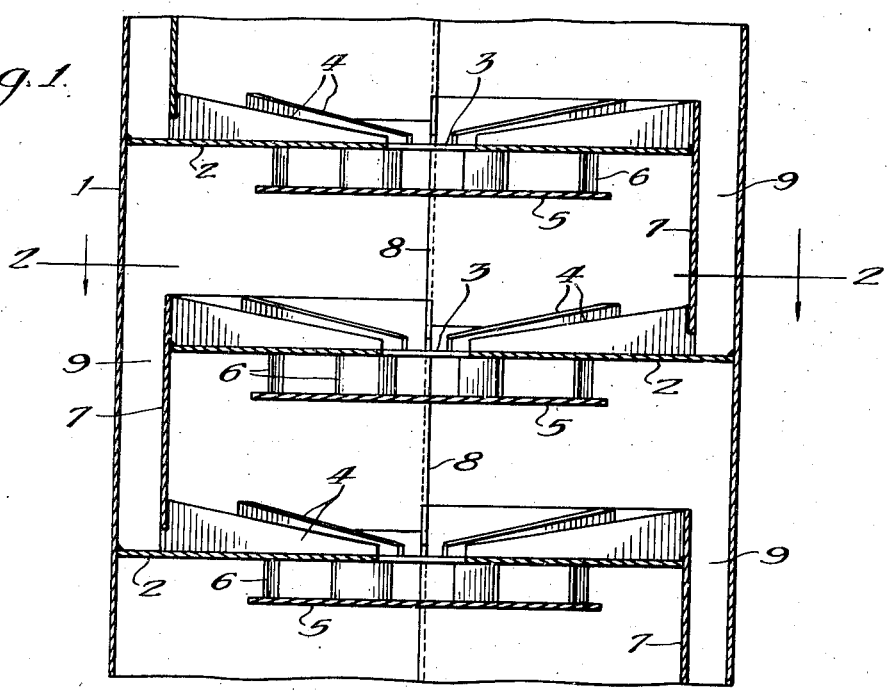
Figure 1 shows an elevational view principally in cross-section of a portion of the improved type of fractionating column.
Figure 2:
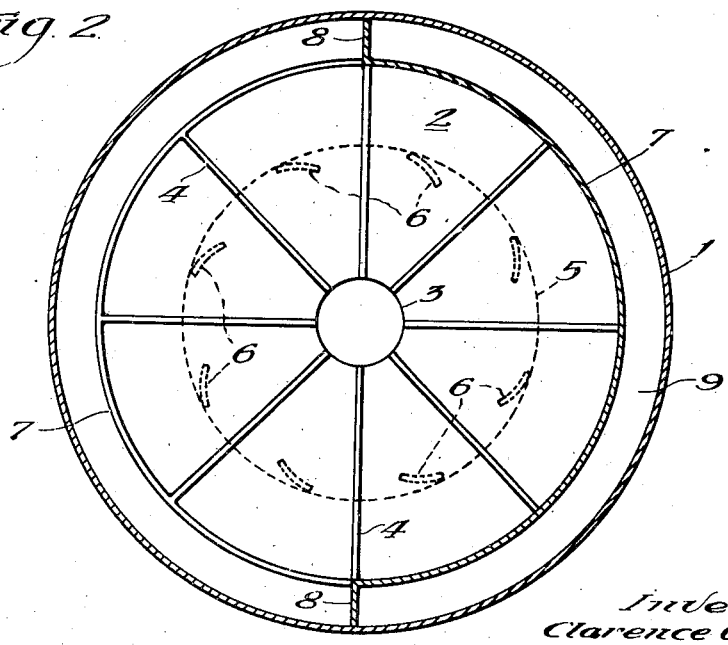
Figure 2 shows a plan view of one of the trays as indicated by the section line 2—2 shown in Figure 1.

In the drawing, the shell 1 of a vertical tower houses a plurality of mixing and contacting tray assemblies, which are disposed at spaced intervals throughout the tower. The main deck or tray plate 2, of one of the assemblies has a center opening 3, and a plurality of vertical plates or fins 4 which will act as stops or centrifugal motion breakers for liquid on top of the tray plate 2. These fins 4 are tapered, and radiate outwardly from the center opening 3 to the inner wall of the downspout opening. The rising gases and vapor in the tower will travel around the circular baffle or vapor deflecting plate 5 and rise up through opening 3 in a centrifugal manner, because of the abrupt change in the flow direction and aid given by the stationary impeller blades or vanes 6. These blades 6 also act as support and spacer bars between the main deck plate 2 and the vapor deflecting plate 5. The vanes 6 may be welded to the respective upper and lower plates or otherwise suitably and rigidly secured.

The vertical semi-cylindrical plate 7 and end closure plates 8, serve to provide a downspout well 9 connecting one tray level to the next. The downspouts 9 are of this elongated shape, extending along half the wall periphery, in order to receive a maximum amount of condensate and reflux which is centrifuged to the outside chamber wall 1.

The edge of the tray plate 2 which extends up to the chamber wall may be supported on a shelf angle or in any other well-known manner, not illustrated. On the downspout half of the tray, the plate 2 and fins 4 may be welded or rigidly fastened by other desired means to the vertical plate 7, and this plate 7 may in turn provide the supporting means from the assembly below, by resting in notches at the ends of the vertical fin plates 4 of the tray next lower. Of course, other means of support may be provided, such as web plates, or the like, which connect the half cylindrical plate 7 directly to the outer shell 1.

The tray 2 and the attached parts may be cast in one piece or welded up in monolithic manner where size permits; however, for large fractionating columns, it may be found advisable to split the deck into sections which can be assembled inside the tower. Additional stiffening ribs and supporting beams, in accordance with good structural design practice, may also be necessary for trays in the larger size towers.

In operation the vapors and gases in the fractionating column rise upwardly, countercurrently to the condensate and reflux liquid stream descending through the column. The vapor stream is given a centrifugal motion as it travels between blades 6 and upward through the opening 3; thus, the spinning stream picks up liquid at the edge of the hole 3 and from a centrifugally rotating mist in the space above the tray. Liquid fractions of condensate are centrifuged to the walls 1 and 7 which encompass the space between trays, while the vapor stream continues upwardly to flow through the next higher tray. The condensate centrifuged to the wall plate 7 will run down to the liquid receiving plate 2 and be channeled inwardly to the edge of the opening 3 where it will again be picked up and contacted by the centrifugally rising vapor stream. The liquid which reaches the tower wall 1 above the downspout opening 9 will run down to the outer edge of the plate 2 on the tray assembly next lower, where the liquid will flow horizontally on the tray towards the center opening 3 and be recontacted by the centrifugally rising vapor stream at this level. The centrifugal contact process between the vapor stream and the liquid takes place continuously at each tray level as described, throughout the height of the tower.

The vertical fins 4, placed on top of the tray plate 2, act to prevent the liquid phase on the deck from rotating, as well as to channel the liquid flow from the outer edge of the deck plate 2 to the center opening 3. These plates 4 are also tapered, being low at the end near the center opening 3, so that the centrifugal action of the gas stream and entrained liquid, which is whirling in the space above the tray will not be interfered with or hindered to any extent.

It is not intended to limit this invention to the exact form as shown and described. For instance, the number of vertical fins 4 or the number of blades 6 may be varied as desired. Also the entire assembly may be constructed of stainless steel or other alloy material where it is desirable to prolong the life of the trays. Some hydrocarbon liquids and vapors have a higher acid content than others, such that there is a more corrosive action on the trays.

Further, the new type of apparatus for the countercurrent contacting of vapors and liquids need not be limited to fractionation, since absorption and gas scrubbing processes may well make use of the method and apparatus of this invention.

The term "fractionation" and the like as used in the specification and appended claims is intended to include methods and means for contacting liquids and vapors or liquids and gases, in general, including absorption, scrubbing and stabilizing processes, as well as fractional condensing and/or distilling methods and means.

I claim as my invention:

1. A fractionating tower of the type described, comprising a vertical chamber, a plurality of liquid and vapor contact trays mounted horizontally and spaced apart within said chamber, each contact tray comprising a horizontal substantially annular deck plate, a plurality of straight vertical flow control fins on the top of said deck and radiating outwardly and tapering upwardly from the inner edge of the plate, a circular vapor deflecting plate spaced a short distance below said deck plate, a plurality of curved directional vanes spaced between the bottom of said deck plate and the outer edge of said vapor deflecting plate, and a semicircular vertically positioned plate spaced from the wall of said chamber and forming with said wall a downspout well for conducting liquid from the space above said tray to the deck plate of the next lower tray.

2. An apparatus of the class described comprising a cylindrical tower; a pair of vertically spaced contact trays within the tower, each of said trays comprising a horizontal substantially annular deck plate, a plurality of straight fins on the upper side of said plate radiating outwardly and tapering upwardly from the inner edge of the deck plate, a horizontal imperforate deflecting plate below the deck plate, and a plurality of curved directional vanes disposed between said plates; and a semi-cylindrical wall spaced from the wall of said tower and extending downwardly from the outer edge of the deck plate of the upper tray into the lower tray.

3. An apparatus of the class described comprising a cylindrical tower; a pair of vertically spaced contact trays within the tower; each of said trays comprising a horizontal substantially annular deck plate, a plurality of straight fins on the upper side of said plate constructed and arranged to channel liquid from the outer edge to the inner edge of the deck plate, a horizontal imperforate deflecting plate below the deck plate, and a plurality of curved directional vanes disposed between said plates; and a semi-cylindrical wall spaced from the wall of said tower and extending downwardly from the outer edge of the deck plate of the upper tray into the lower tray.

CLARENCE G. GERHOLD.

REFERENCES CITED

The following references are of record in the file of this patent:

UNITED STATES PATENTS

| Number | Name | Date |
|---|---|---|
| 1,366,956 | Schneible | Feb. 1, 1921 |
| 1,557,112 | Schneible | Oct. 13, 1925 |
| 1,878,467 | Clarke | Sept. 20, 1932 |
| 2,114,786 | Schneible | Apr. 19, 1938 |
| 2,250,757 | Fisher | July 29, 1941 |